(12) United States Patent
Seagren

(10) Patent No.: US 6,399,366 B1
(45) Date of Patent: Jun. 4, 2002

(54) METHOD AND APPARATUS FOR COMPOSTING ORGANIC WASTE TOGETHER WITH ITS PACKAGING CARTONS, BOXES OR CRATES ON SITE

(76) Inventor: Eric Seagren, 351 Toll House La., Fairfield, CT (US) 06432-1056

( * ) Notice: Subject to any disclaimer, the term of this patent is extended or adjusted under 35 U.S.C. 154(b) by 0 days.

(21) Appl. No.: 09/499,558

(22) Filed: Feb. 7, 2000

(51) Int. Cl.$^7$ ................................................ C12M 1/02
(52) U.S. Cl. ............................... 435/290.2; 435/290.4; 241/101.2; 241/DIG. 38
(58) Field of Search ........................... 435/290.1, 290.2, 435/290.3, 290.4; 241/33, 101.1, 101.2, DIG. 38

(56) References Cited

U.S. PATENT DOCUMENTS

| | | |
|---|---|---|
| 3,721,183 A | 3/1973 | Dunlea, Jr. |
| 4,830,188 A | 5/1989 | Hannigan et al. ............... 209/3 |
| 5,101,977 A | 4/1992 | Roman ........................... 209/3 |
| 5,165,612 A | 11/1992 | Brown ..................... 241/101.8 |
| 5,244,804 A * | 9/1993 | Horkan et al. .............. 435/299 |
| 5,292,637 A * | 3/1994 | Bohnensieker ................. 435/3 |
| 5,377,921 A | 1/1995 | Wirth ........................... 241/29 |
| 5,425,507 A | 6/1995 | Stumpff ................... 241/152.2 |
| 5,559,033 A * | 9/1996 | Young ..................... 435/290.3 |
| 5,587,320 A * | 12/1996 | Shindo et al. ........... 435/290.1 |
| 5,766,935 A * | 6/1998 | Seagren ................... 435/290.2 |

\* cited by examiner

Primary Examiner—David A. Redding
(74) Attorney, Agent, or Firm—Fattibene & Fattibene; Arthur T. Fattibene; Paul A. Fattibene

(57) ABSTRACT

The apparatus includes a housing having a shredding station, a blending or mixing station, a receiving chamber for receiving boxes and/or crates in a shredded state, and a decomposition chamber for receiving a mixture of the shredded organic waste and the shredded carton material. A conveyor selectively directs either the crate waste in the shredded state from the shredding station to the receiving chamber or directs a mixture of shredded organic waste and the shredded crate material to the decomposition chamber. A separate conveyor is associated with the receiving chamber to convey the shredded crate material from the receiving chamber back to the shredding and mixing station,

11 Claims, 10 Drawing Sheets

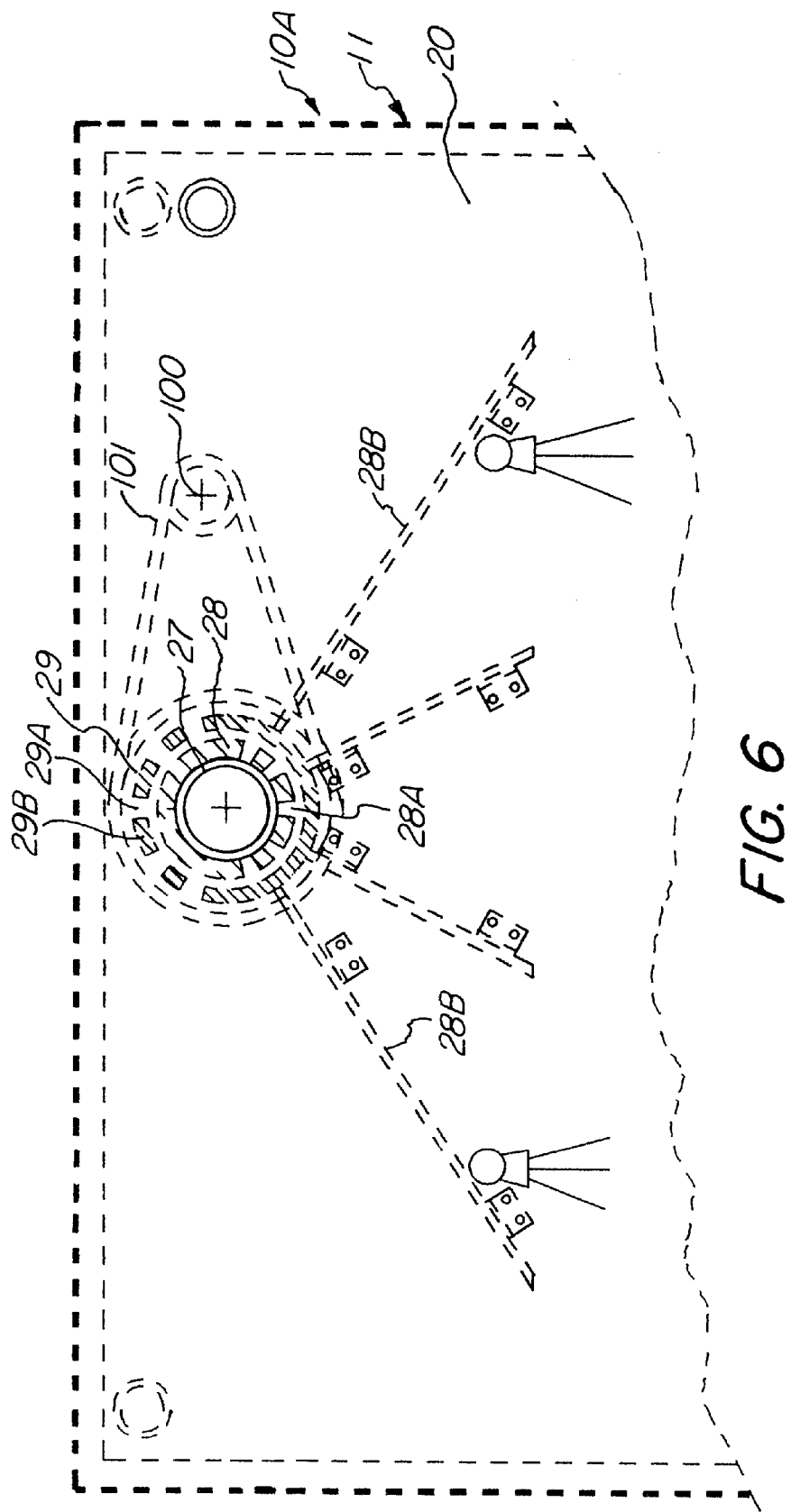

METHOD AND APPARATUS FOR COMPOSTING ORGANIC WASTE TOGETHER WITH ITS PACKAGING CARTONS, BOXES OR CRATES ON SITE

FIELD OF THE INVENTION

This invention relates to a method and apparatus for composting organic waste, and more specifically to a method and apparatus for recycling and/or converting waste organic products, e.g. rotten or spoiled fruits, vegetables and the like, together with the cardboard boxes, cartons, and/or wooden crates in which such organic waste is normally packaged and/or shipped, into usable compost on site.

BACKGROUND OF THE INVENTION

Heretofore, the accumulation of waste products at various types of food establishments, e.g. grocery stores, supermarkets, large restaurants, wholesale fruit and vegetable packers, food distributors and the like, has resulted in a considerable waste disposal problem. Such waste consists primarily of spoiled fruits, vegetables and the crates and cartons in which such products are shipped. Generally, the crates and cartons, which are generally formed of wood or cardboard, had to be segregated from the spoiled fruits and vegetables and treated separately for disposal purposes. In addition, the accumulations of such waste had to be separately carted in dumpsters to various land fills or other suitable disposable areas, e.g. incinerators or the like. As landfills are being phased out in many regions, and incineration constitutes a source of air pollution, the problem of the disposing of such organic waste material and the cartons or crates in which fruits and vegetables are generally shipped is ever-increasing, rendering it ever more expensive for such establishments to dispose of this type of waste material.

As a result of this ever-increasing problem, numerous attempts have been made in an effort to solve this growing disposal problem. Some of these known efforts are disclosed in U.S. Pat. Nos. 3,721,183; 4,830,188; 5,101,977; 5,165,612; 5,377,921 and 5,425,507. Generally, such known efforts have resulted in relatively complex and costly apparatuses and/or methods limited to treating only certain types of waste, e.g. rubbish processed into various predetermined shapes, plastic materials, municipal solid waste (MSW), organic wastes, metals, glasses and the like. Each such known system has its specific use and/or limitations, and/or requires relatively complex and costly apparatuses.

In my prior U.S. Pat. No. 5,766,935 granted Jun. 16, 1998, there is disclosed an apparatus wherein organic waste such as rotten or spoiled fruits, vegetables and the like, and the cardboard boxes, cartons and/or wooden crates in which they were shipped or packaged, were simultaneously disposed of by shredding to form mixture of organic waste and cardboard boxes and crates that is conveyed to a decomposition chamber in which the mixture is composted.

It has been observed that to properly compost a mixture of organic waste, i.e. waste vegetable matter mixed with cardboard cartons, boxes and/or wooden crates in which fruits and vegetables are normally packaged, that there be preferably an approximate fifty to fifty or 1 to 1 ratio of organic waste material to the carton or box material. However, due to inexperience or lack of knowledge, it frequently happens that those charged with disposing of such waste material neglected to achieve the fifty-fifty or 1 to 1 ratio of organic waste to cardboard or carton waste so as to achieve the optimum composting mixture. Therefore, those charged with the disposal of such materials for composting would frequently effect composting of the organic waste and cardboard or carton material in ratios other than the approximate preferred ratio of 1 to 1 by weight, and as a result thereof, the composting time would be unduly extended and/or not properly achieved.

SUMMARY OF THE INVENTION

This invention is directed to an improved method and apparatus for disposing of organic waste, e.g. rotten or wasted fruits and vegetables and like organic waste (herein referred to as organic vegetable waste), and the cardboard containers or crates (herein referred to as packaging waste) in which such produce are normally shipped to various grocery outlets, supermarkets, restaurants and the like from that described in U.S. Pat. No. 5,766,935. Basically, the instant invention includes an outer shell or housing containing a component section and a connected decomposition chamber for receiving the optimum mixture of organic vegetable waste and packaging waste, and a receiving chamber for receiving only the material of the packaging waste, i.e. the cardboard boxes, cartons or crates. The carton or box receiving chamber is disposed in tandem relative to the decomposition chamber.

The component section includes a shredding station which contains a hopper or chute for directing the organic vegetable waste or the packaging waste, i.e. the cardboard container or crates, to a grinder where the waste, i.e. the cardboard or wooden containers and the organic vegetable waste are separately and independently ground or shredded into small pieces or fragments. A mixer or blender is disposed adjacent the outlet of the grinder to blend or mix the shredded organic vegetable waste and the separated, previously shredded cartons or packaging waste into a homogenous mixture. This is achieved by first shredding the cardboard or wooden containers and crates, and conveying the shredded box or crate residue by an overhead conveyor to the carton receiving chamber where it is temporarily stored. The organic vegetable waste is then directed to the grinder to be likewise ground or shredded. As the organic material passes through the grinder and before entering the mixer, it is combined with a predetermined amount of the previously shredded cardboard or wooden cartons or crates that is conveyed from the carton receiving chamber by a lower conveyer to the component section where organic vegetable waste and shredded carton material or packaging waste are proportionally mixed in a predetermined ration, e.g. 1 to 1, and fed to the mixer for blending into a homogeneous mass. The homogeneous mass or mixture of shredded organic vegetable waste and shredded boxes or carton waste is thereafter conveyed from the mixer to an overhead conveyor for discharge into the decomposition chamber wherein decomposition is initiated. In accordance with this invention, the overhead conveyor is arranged to selectively convey either the shredded cartons and/or crates material to the carton receiving chamber or alternately to convey the homogeneous mixture of shredded organic vegetable waste and shredded carton material to the decomposition chamber.

The mixture conveyed to and deposited into the decomposition chamber is then treated and aerated in a manner similar to that described in my prior U.S. Pat. No. 5,766,935 to initiate the composting process.

A second conveyor is disposed along the bottom of the decomposition chamber for moving the decomposing mass from the decomposition chamber and through the receiving chamber to a discharge outlet where it can be collected and trucked away or bagged for subsequent resale as compost or fertilizer or may be conveyed to a secondary decomposition chamber superposed above the main housing for further composting or storage. One or more secondary decomposition chambers may be stacked one on the other above the main housing. If desired, a spray may be provided within the respective decomposition chambers for introducing a predetermined amount of moisture into the respective chambers to aid in the decomposition of the waste material therein.

An object of this invention is to provide a method and apparatus whereby the cardboard box or carton material is initially separately shredded and thereafter subsequently combined with the organic vegetable waste being shredded in a predetermined ratio to form the optimum composting mixture of vegetable organic waste and packaging material such as boxes and/or crates.

Another object of this invention is to provide a method and apparatus for separately and independently shredding the packaging waste that includes a conveying arrangement for selectively conveying the shredded packaging waste to the box or crate receiving chamber for storage or conveying the mixture of shredded vegetable organic waste combined with the shredded packaging waste to the decomposition chamber.

Another object of this invention is to provide a composting apparatus having a mixing section, a receiving chamber for receiving the shredded packaging waste, a connected decomposition chamber, and a conveyor for conveying the shredded packaging material from the shredded carton receiving chamber to the mixing station for mixing with the shredded organic waste to form a homogeneous mixture which is then directed to the decomposition chamber for composting.

Another object of this invention is to provide a composting apparatus with a conveyor for selectively conveying either the mixture of organic waste and packaging waste to the decomposition chamber or the packaging or box material only to its receiving chamber.

Another object of this invention is to provide a composting apparatus with a conveyor for automatically conveying a predetermined amount of shredded packaging waste from its receiving chamber to be mixed with a predetermined amount of incoming shredded organic vegetable waste so as to achieve an optimum combined mixture for composting.

Another object of this invention is to provide for a compact, self-contained unit that is relatively simple in construction, and positive in operation.

Another object is to provide a method and apparatus for composting a mixture of waste cardboard or packaging waste and organic vegetable waste matter to form a reusable compost material.

Another object is to provide an on-site composting apparatus for converting waste cardboard and spoiled fruits or vegetables into reusable compost on site.

Another object is to provide a process whereby the volume of waste can be drastically reduced by speeding up the decomposition cycle and recycling the resulting end product as reusable compost.

Other features and advantages will become more readily apparent when considered in view of the drawings and following description.

IN THE DRAWINGS

FIG. 6 is a section view taken along line 6—6 on FIG. 1.

DETAILED DESCRIPTION

Figure 1:
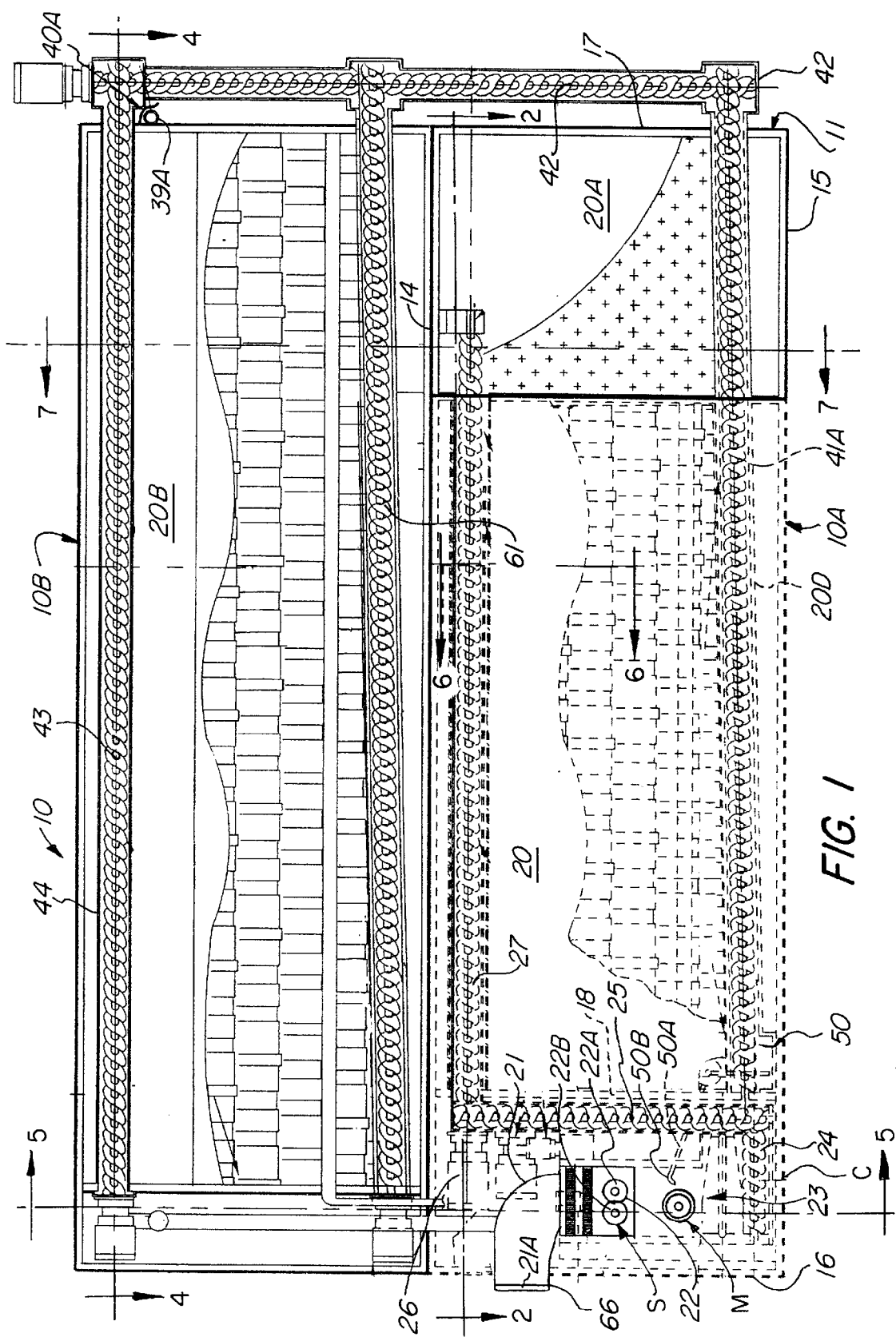
FIG. 1 is a sectional side elevation view of an embodiment of this invention.
Figure 2:
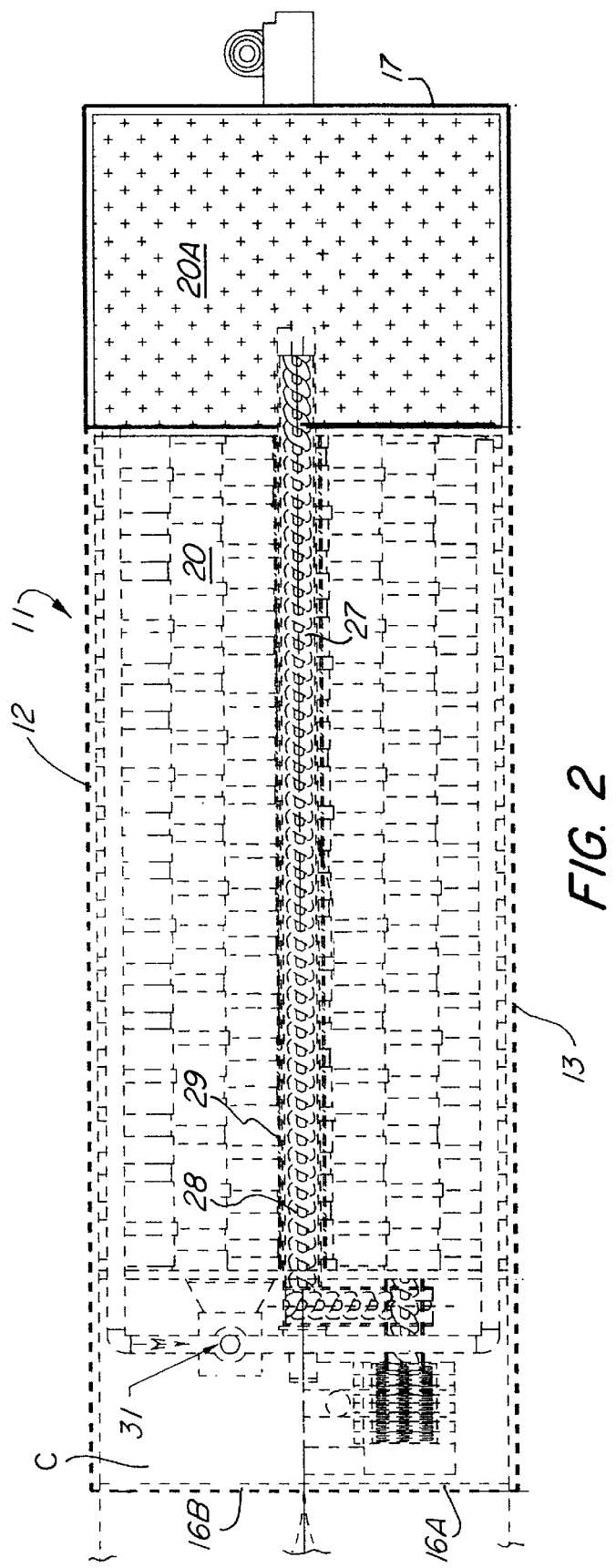
FIG. 2 is a sectional plan view taken along line 2—2 on FIG. 1.
Figure 9:
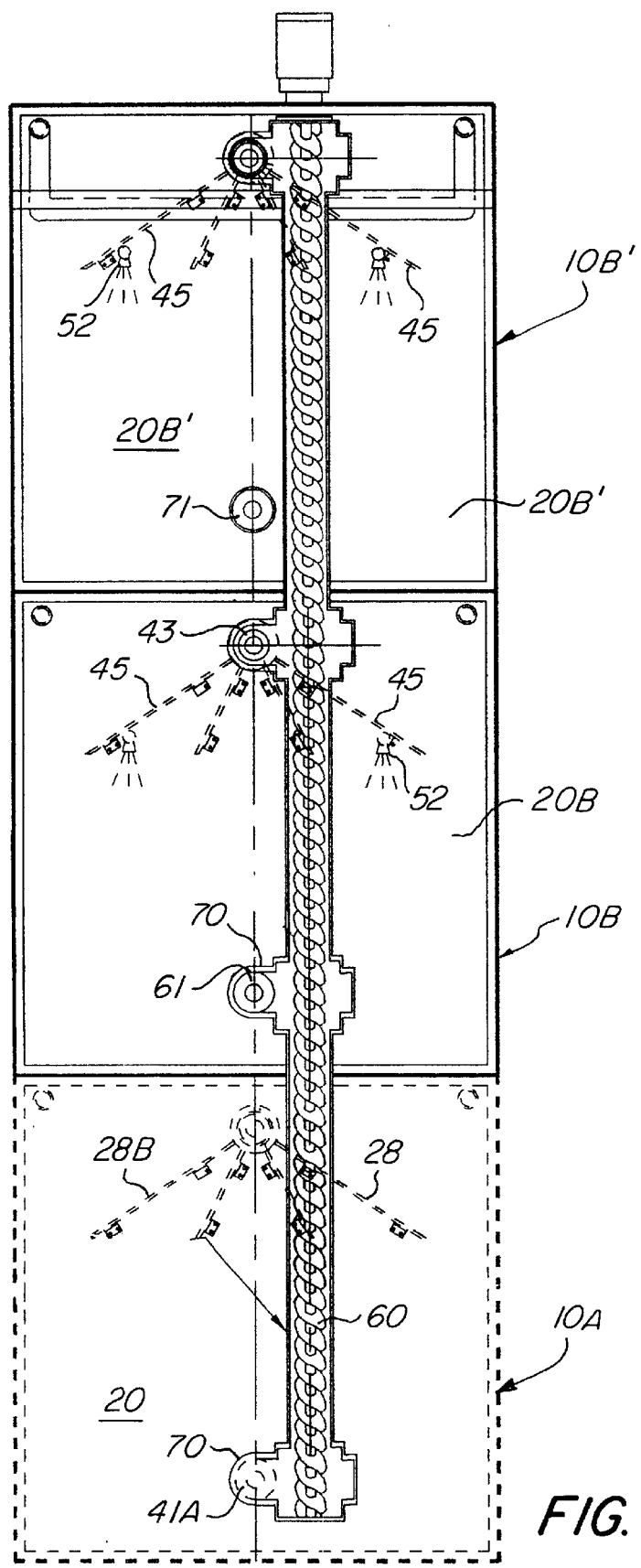
FIG. 9 is a right end view of a modified embodiment.

Referring to the drawings, there is illustrated in FIG. 1 an embodiment of the present invention. As shown, the on-site composting apparatus 10 comprises a lower section 10A and an upper section 10B. The lower section 10A comprises an outer shell or housing 11 having opposed side walls 12 and 13 with connected top and bottom walls 14 and 15, respectively, and enclosed by end walls 16 and 17 to define an elongated enclosure or box-like housing 11. It will be understood that the housing 11 is formed of suitable weatherproof materials as e.g. sheet metal, wood, or any other suitable weatherproof structural building material. The illustrated housing 11 is approximately 8 feet by 8 feet by 20 feet, whereby it can be rendered readily portable. However, it will be understood that the respective dimensions are not critical, and the housing 11 can be variously sized depending upon the desired capacity of the unit. As it will be hereinafter noted, a shredder S and a mixer M are housed within the front component section "C." The entire housing 11, as best seen in FIG. 1, is partitioned to define a component section "C", a decomposition chamber 20 and a tandemly connected separate receiving chamber 20A for receiving the shredded carton and box waste as will be herein described. Superposed above the tandem decomposition chamber 20 and shredded carton receiving chamber 20A is an upper section 10B to define a secondary decomposition or holding chamber 20B, bounded by enclosing opposed side walls, opposed end walls and a top and bottom wall, so that it can be stacked as a unit above the main housing 11, when it is to be used as needed. If desired, one or more of such secondary decomposition chambers 20B may be stacked one upon another. FIG. 9 illustrates an embodiment wherein two decomposition chambers 20B and 20B' are shown in stacked arrangement.

As best seen in FIG. 1, the housing 11 is internally divided by a partition or wall 18 to separate the component section C from the adjacent composting chamber 20. The end wall 16 (FIG. 5A) may be defined by two door panels 16A, 16B which are suitably hinged to swing between open and closed position so as to provide ready access to the component section C.

Figure 5:
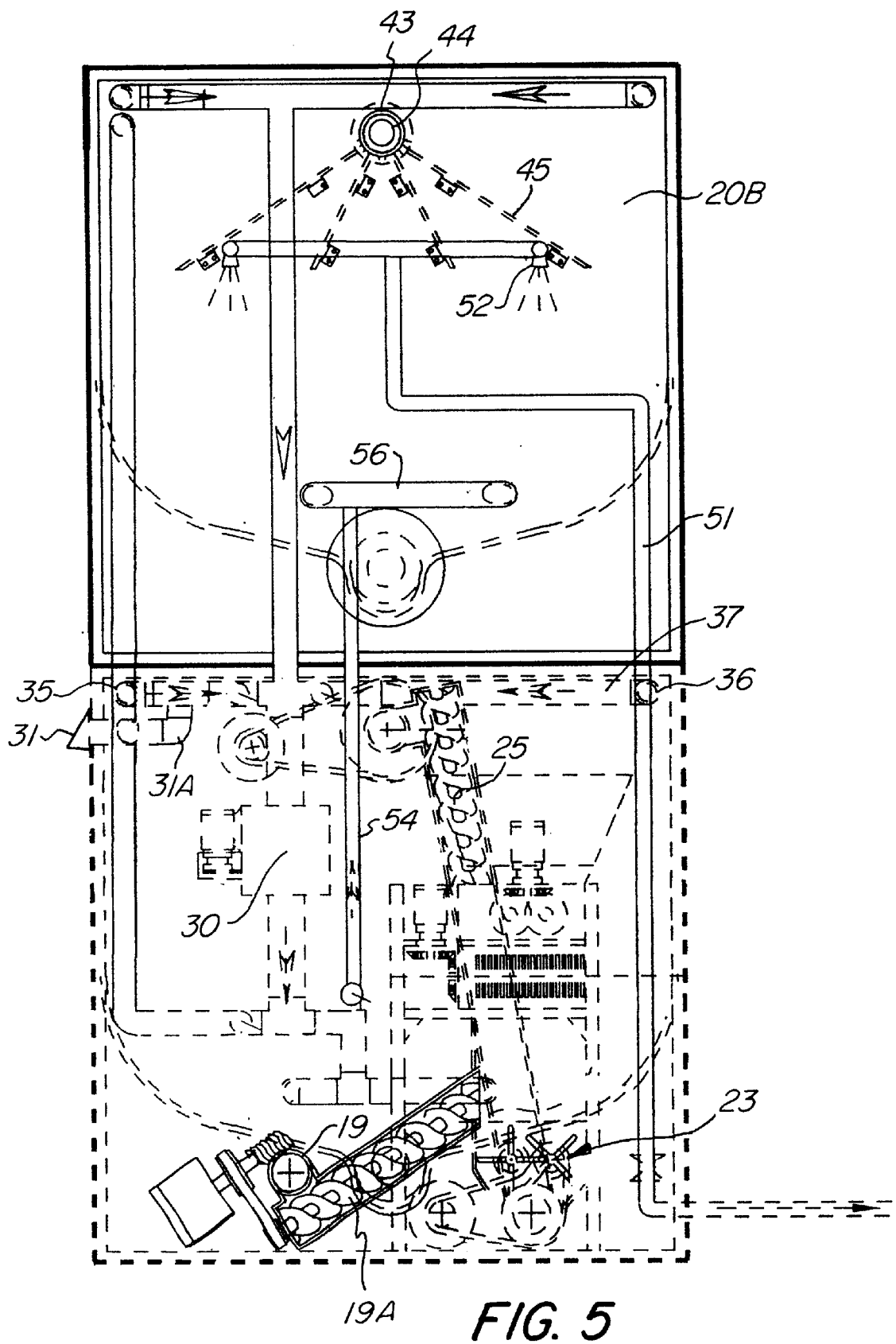
FIG. 5 is a sectional end view taken along line 5—5 on FIG. 1.
Figure 5B:
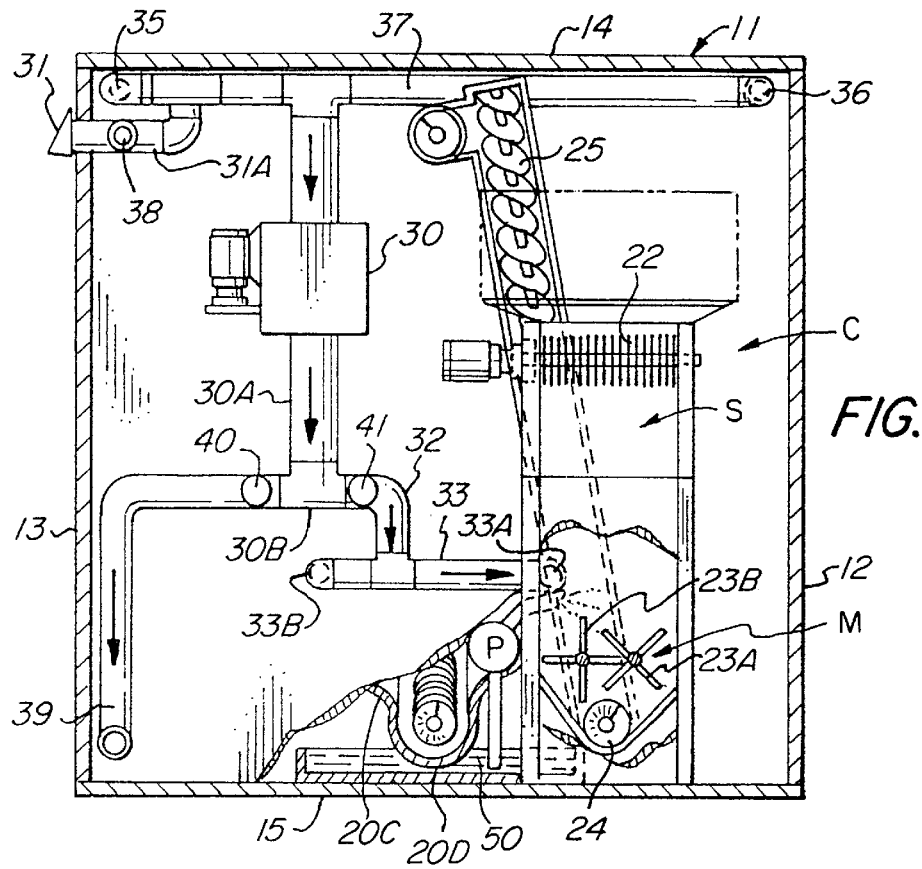
FIG. 5B is a fragmentary sectional end view of the component section.
Figure 5A:
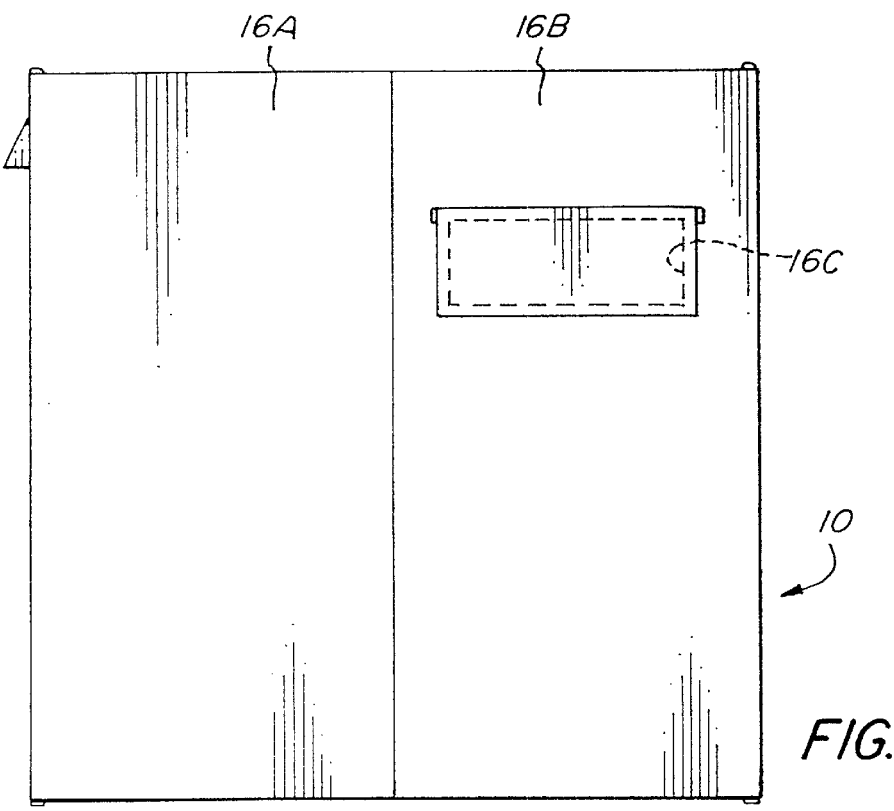
FIG. 5A is an end view of the component section.

As best seen in FIG. 5A, one of said door panel 16B is provided with an opening 16C for receiving the inlet 21A of a chute or hopper 21 into which the organic waste, such as fruits, vegetables, cartons and the like to be disposed are placed. Adjacent the outlet or bottom of the chute or hopper 21 is a grinder or shredder 22 for grinding or shredding the waste material. As best seen in FIG. 1, the grinder or shredder comprises a series of counter-rotating cutting blades 22A, 22B, through which the waste material passes. The grinding or shredding of the waste material into greatly reduced size facilitates the decomposition thereof, as will be herein described. Disposed adjacent the discharge end of the grinder or shredder is a mixer 23 which blends or mixes the various types of waste material directed thereto as will he hereinafter described. As seen in FIG. 5B, the mixer 23 may comprise counter rotating paddle wheels 23A, 23B as disclosed in my prior U.S Pat. No. 5,766,935.

Disposed below the mixer 23 is a conveyor, e.g. a screw conveyor or auger 24 for receiving and advancing the shredded waste passing through the mixer 23 toward a second or vertical conveyor 25 disposed in the decomposition chamber 20. In the illustrated embodiment, the vertical conveyor 25 comprises a screw or auger for lifting the shredded material to the upper portion of the decomposition chamber 20 where the material is transferred to a horizontal distributing conveyor 27.

At the upper end of the component section is a suitable driving means, e.g. an electric motor 26 for driving the horizontal distributing conveyor 27 illustrated in the form of a horizontal screw conveyor which is operative for selectively conveying and uniformly dispersing either the homogeneous mixture organic waste and packaging waste along the length of the decomposition chamber 20 as will be herein described, or for conveying only the shredded packaging waste, i.e. the box or carton material to the receiving chamber 20A as will be herein described.

Referring to FIG. 6, the horizontal dispersing or distributing overhead conveyor 27 is disposed within a trough or conduit 28 that extends along the upper end of the decomposition chamber 20 and terminates in receiving chamber 20A. As shown, the trough or conduit 28 is provided with a series of longitudinally extending and circumferentially spaced openings or slots 28A. Disposed about and rotatably mounted for rotation relative to the conduit or trough 28 is a rotatable control sleeve 29 co-extensive the length of the decomposition chamber 20. The control sleeve 29 is also provided with longitudinal slots or openings 29A arranged to be rotated into and out of registration with slots 28A of conduit 28. When the imperforate portions 29B formed between slots 29A of control sleeve 29 are rotated into registration with openings 28A of conduit 28, the openings 28A of trough or conduit 28 are effectively closed so that any material being conveyed by conveyor 27 is directed to and discharged into the receiving chamber 20A. When the imperforate portions 29B of the control sleeve 29 are rotated out of registration with opening 28A, openings 28A are open so that materials being conveyed by conveyor 27 are discharged through openings 28A and into the decomposition chamber 20. An indexing or timing motor 100, operatively connected by a belt drive 101 to the control sleeve 29 is provided to sequence the control sleeve 29 to open or close openings 28A accordingly.

It will be noted that as the conveyor or auger 27 is actuated and the control sleeve 29 is rotated to open slots 28A, the mixture of organic vegetable waste and packaging waste being advanced along the trough 28 will pass through the openings 28A to discharge uniformly along the length of the decomposition chamber 20. A plurality of radially spaced baffles 28B are connected to conduit 28 extending longitudinally for dispersing the waste material laterally of the decomposition chamber 20 to uniformly distribute the shredded mixed waste material, both longitudinally and laterally of the decomposition chamber, to enhance the rate of decomposition. When the packaging material is being shredded, the control sleeve 29 is indexed or rotated to a position closing openings 28A so that the shredded packaging waste is conveyed by the conveyor 27 for discharge into the receiving chamber 20A.

In operation, the cardboard cartons or wooden crates in which fruits, vegetables and the like are shipped are shredded first and conveyed to the receiving chamber 20A as described. To ensure that the shredded container or crate waste is conveyed to receiving chamber 20A, the control sleeve 29 is rotated or indexed so as to effectively close openings 28A. Thus, the shredded carton material is conveyed by means of conveyors 24, 25 and 27 from the shredder 22 to the receiving chamber 20A and stored therein until needed for blending with the shredded organic vegetable waste.

Figure 3:
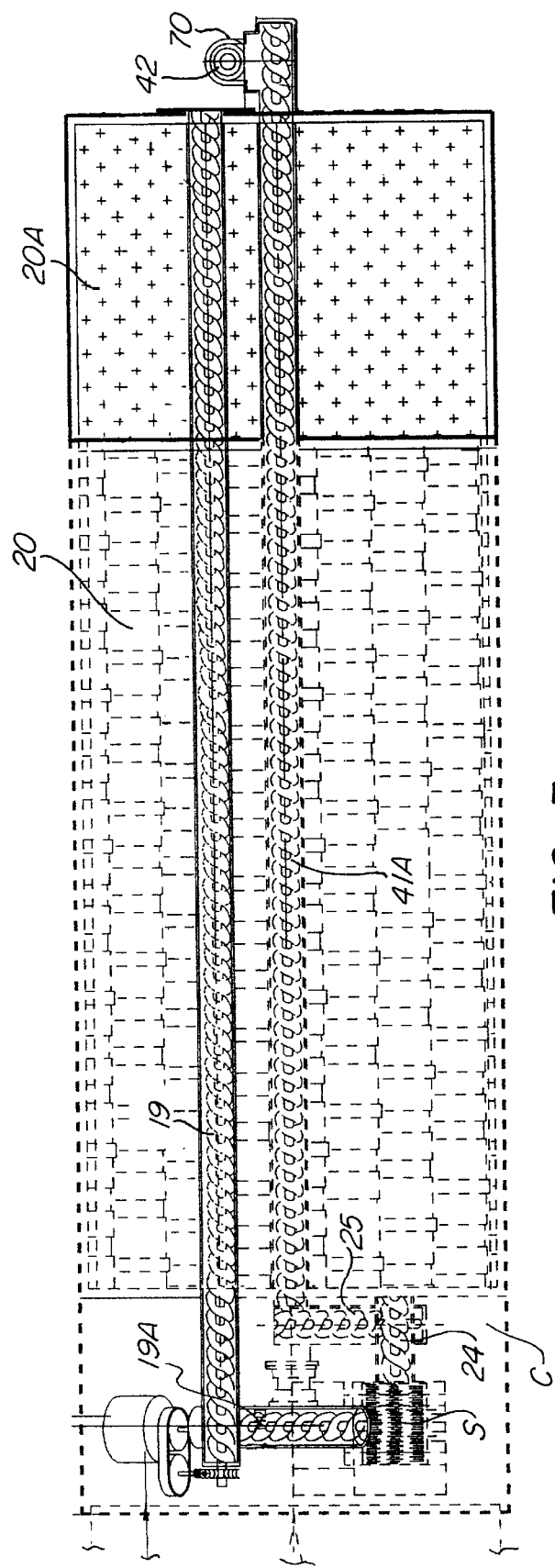
FIG. 3 is a sectional end view taken along line 3—3 on FIG. 7.
Figure 4:
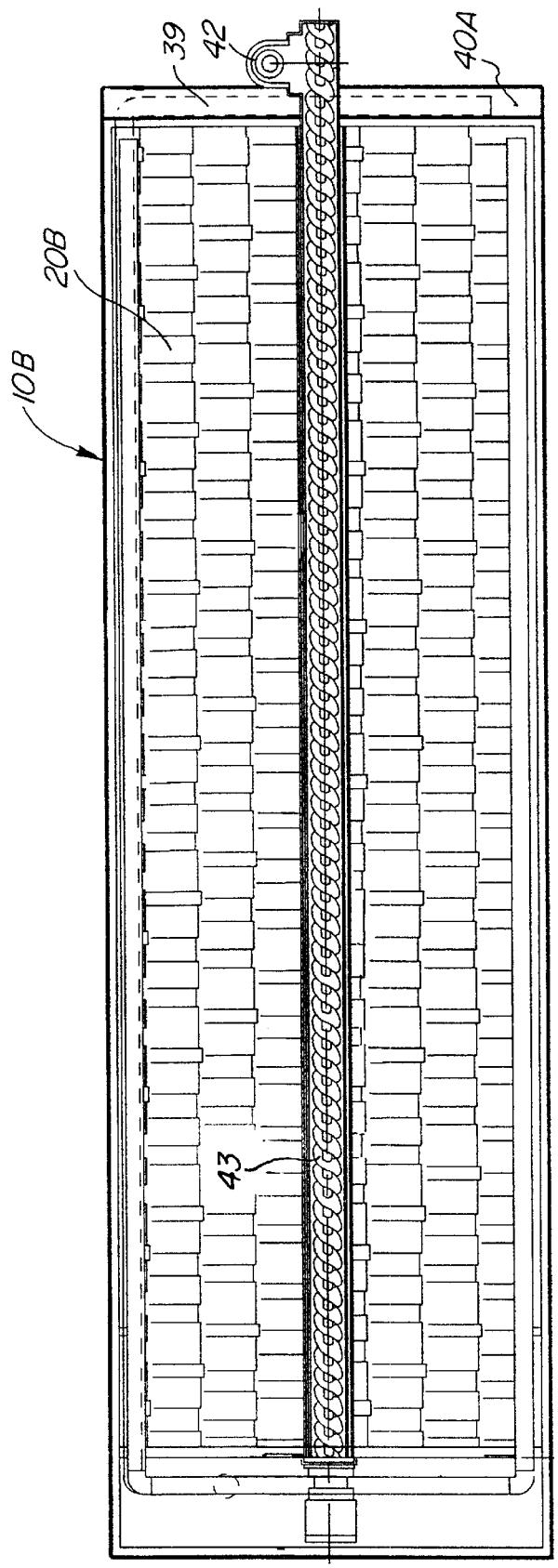
FIG. 4 is a sectional plan view taken along line 4—4 on FIG. 1.

With a sufficient amount of shredded container material held in storage in the receiving chamber 20A, the organic waste, e.g. rotten or spoiled fruits, vegetables and the like are fed to the shredder 22 to be ground or shredded. As the shredded organic vegetable material passes through the shredder 22 and before it enters the mixer 27, a predetermined amount of the shredded carton or crate material is conveyed from storage in the receiving chamber 20A to the mixing station for mixing with the organic vegetable waste being shredded. This is achieved by a conveyor 19 illustrated in the form of a screw or auger that conveys the shredded packaging material from the shredded carton receiving chamber 20A to the inlet of the mixer 23 where it is combined with the organic waste as it discharges from the grinder 22 and into the mixer 23. The arrangement is such that the conveyor 19 (as seen in FIG. 3) transporting the shredded carton material from the receiving chamber 20A is discharging, by weight, an amount of shredded packaging material approximately equal to the amount of organic vegetable waste by weight, entering the mixer 23 from the grinder 22 so that the shredded packaging material and the shredded organic waste directed to the mixer for blending forms a 1-to-1 homogenous mixture as it passes from the mixer 23.

As the mixture of organic and packaging waste passes through the mixer, the resulting blend is conveyed by conveyor 25 to conveyor 27 for distribution to the decomposition chamber 20. At this stage of the process, the control sleeve 29 is indexed to be out of register relative to conduit 28, so that openings 28A are in the opened position, causing the blended mixture being conveyed by conveyor 27 to be discharged into the decomposition chamber 20.

Figure 7:
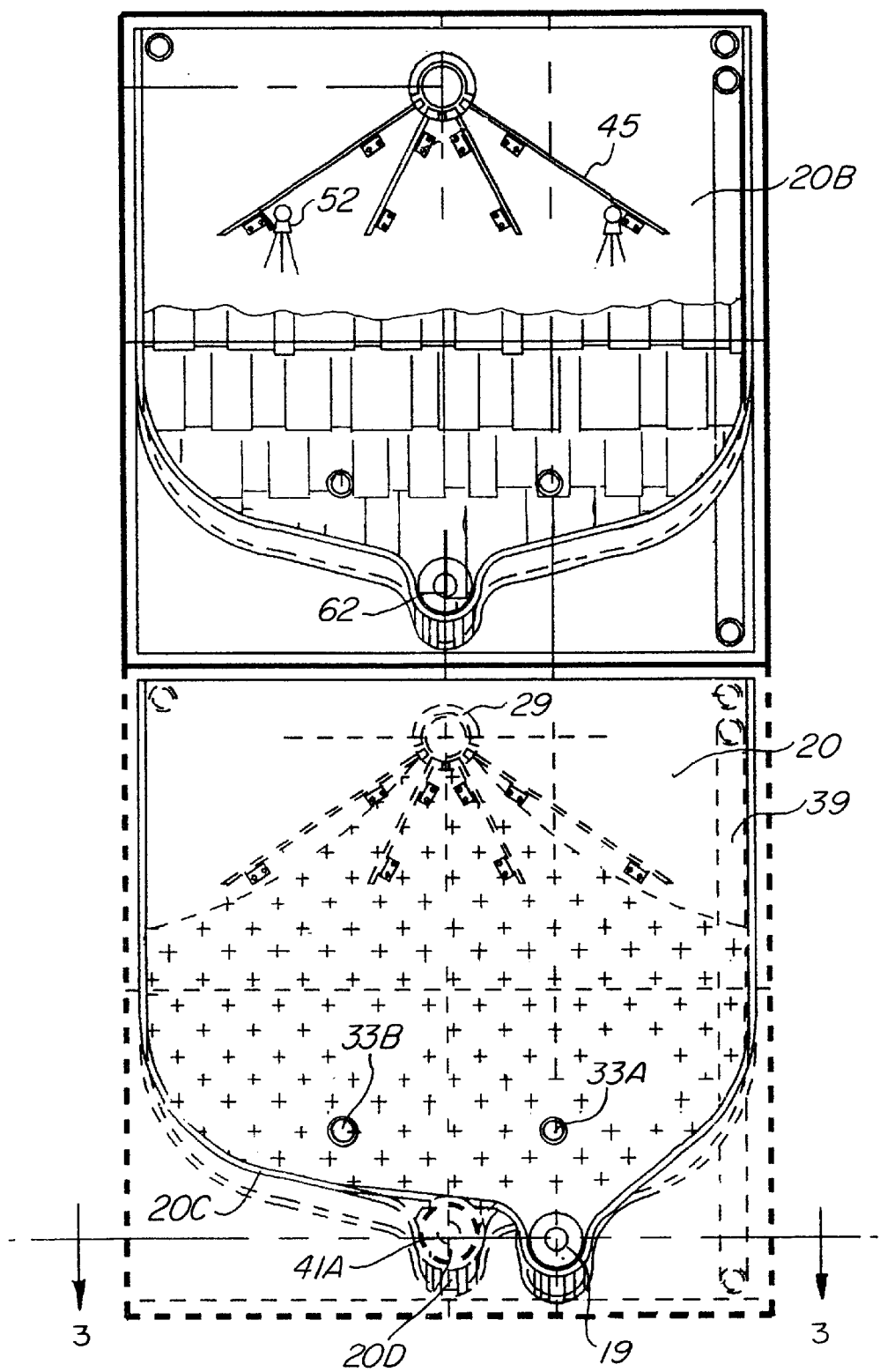
FIG. 7 is a sectional end view taken on line 7—7 of FIG. 1.
Figure 8:
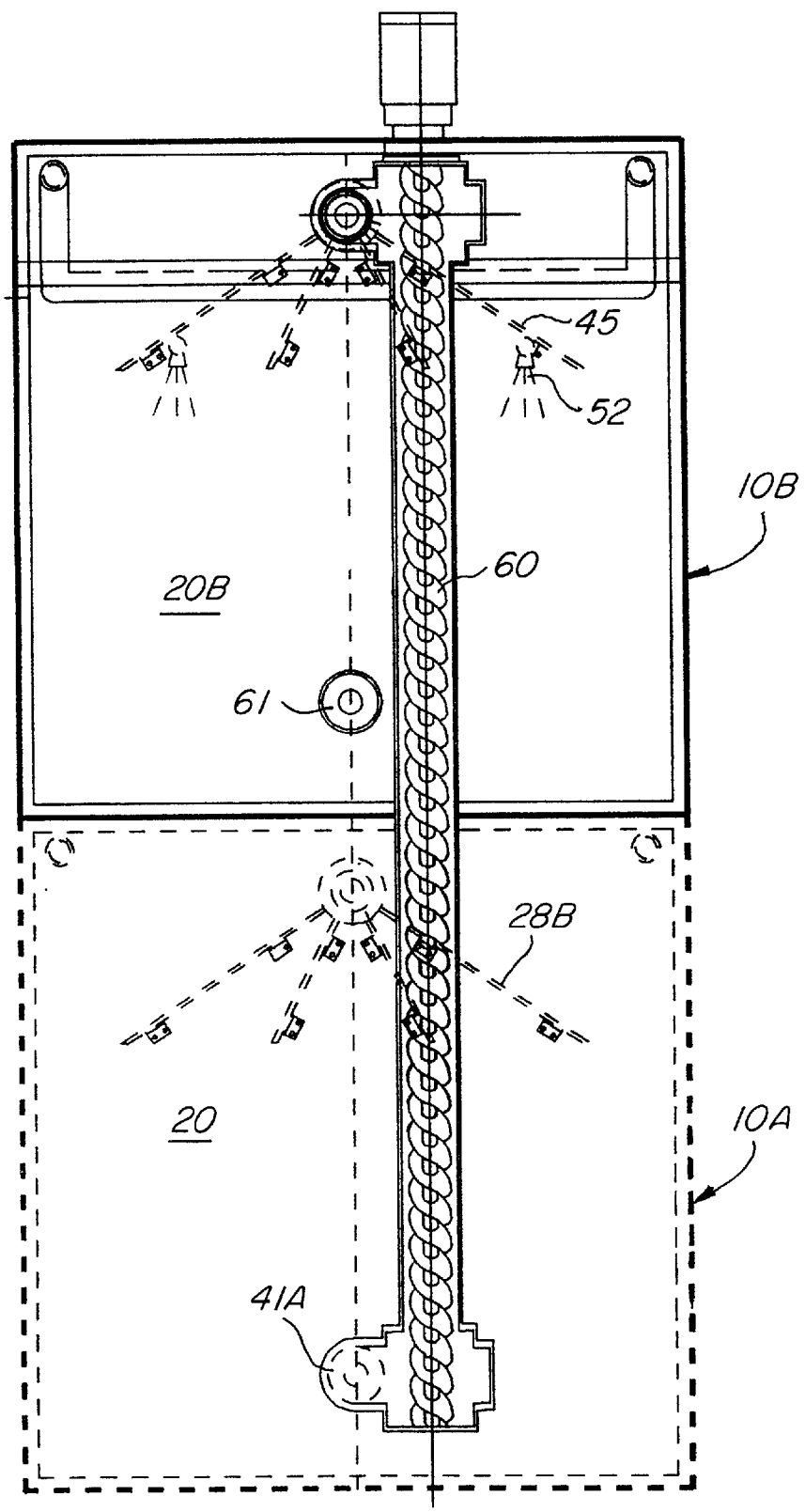
FIG. 8 is a right end view of FIG. 1.

To aid in the decomposition of the homogeneous mixture being dispersed within the decomposition chamber 20 is a means for introducing air for aerating the blended homogenous mixture as it is being dispersed. The aerating means comprises an air blower 30 which is connected into communication with a suitable fresh air inlet 31. The outlet 30A of the blower 30 is connected to a conduit 32 which is connected into communication with a U shaped aerating conduit 33 having spaced parallel side arms 33A, 33B extending horizontally of the decomposition chamber 20 at a location spaced above the bottom of the decomposition chamber 20. As shown in FIG. 7, the bottom 20C of the decomposition chamber 20 slopes toward a centrally disposed and longitudinally extending well portion 20D. The well portion 20D, as shown in FIG. 1, is sloped downwardly to the left so as to drain any excess moisture toward a drain pan or collector 50. If desired, the internal surface of the decomposition chamber may be coated with an anti-stick material such as Teflon so as to prevent any of the waste from sticking thereto, and to facilitate the gravitation of the waste toward the well portion 20D which forms the lowermost portion of the decomposition chamber 20.

The parallel side arms 33A, 33B of the aerating conduit 33 are perforated with a series of openings through which aerating air is introduced into the decomposition chamber. In operation, the aerating air discharging through the perforations of conduit 33 to aerate the homogeneous waste material being dispersed longitudinally and laterally of the decomposition chamber to aid in converting the waste material into reusable compost over a period of time.

A means is provided for recirculating the aerating air being introduced into the decomposition chamber 20 back to the negative side of the blower 30 for recirculation to the decomposition chamber. This is attained by providing opposed air recirculation conduits 35, 36 which are perforated or provided with openings. Conduits 35 and 36 connect into communication with an interconnecting branch 37 for re-directing the recirculating air back to the negative side of the blower 30. As best seen in FIGS. 5 and 5B, the air inlet 31 connects into the recirculation branch 37 by conduit 31A, whereby the incoming fresh air is mixed with the recirculating air being redirected to the blower 30. To proportion or control the amount of incoming fresh air, a control valve or proportioning damper 38 is disposed in conduit 31A.

Connected to the outlet 30A of the blower 30 is a tee connection 30B. One end of the tee connection 30B is connected in communication to the aerating conduit 33 and the other end of the tee connection 30B is connected into communication with an exhaust conduit 39 which exhausts to the atmosphere at 39A located at the rear of the upper section 10B. As best seen in FIG. 5B, proportioning dampers 40 and 41 are disposed at opposed ends of the tee connection 30B so as to control or proportion the amount of air being directed to the aerating conduit 33 and the exhaust conduit 39. The exhaust conduit 39 extends along the bottom of the housing 11 and then upwardly along the rear wall 17 and thence horizontally to exhaust exteriorly thereof as at 39A. A shield or cover 40A is provided to protect the exposed portion of the external exhaust conduit 39A.

The exhaust conduit 39 may be filled with a suitable filtering material, e.g. charcoal or with a bio-filtering material, e.g. the residue compost for minimizing the odor of the exhausting air or gases to atmosphere.

Disposed in the well 20D of the decomposition chamber is a discharging conveyor in the form of a screw or auger 41A for advancing the reusable residue or compost to a discharge opening 42 where the compost can be collected or bagged into suitable containers as described in my U.S. Pat. No. 5,766,935. However, as disclosed herein, the conveyor 41A may also discharge into an inlet of a vertical conveyor 42 for conveying the composting material to a secondary composting chamber 20B which is superposed onto housing 11 for further composting and/or storage.

As shown in FIGS. 1 and 5, the secondary composting chamber 20B, generally similar in size to the housing 11, is superposed thereon to conserve space. The vertical conveyor 42 transports the composting mixture from the outlet of the discharging conveyer 41A to the inlet of a horizontally disposed dispersing conveyor 43 extending along the top of the secondary chamber 20B. The illustrated dispersing conveyor 43 is a screw conveyor turning within an elongated trough or conduit 44 formed with a plurality of spaced openings for dispersing the composting material generally uniformly along the length of the secondary chamber 20B, similar to the openings 28A of conduit 28 hereinbefore described. It will be understood that the trough or conduit 44 may be provided with a series of dispersion baffles 45 as hereinbefore described.

In accordance with this invention, the cardboard cartons, boxes, wooden crates and the like in which the fruits and vegetables are normally shipped are initially disposed of by placing them into the hopper 21 for shredding. After shredding, the shredded package or crating material is conveyed by means of conveyors 24, 25, and 27 to the cardboard and wood receiving chamber 20A. It will be understood that when the cardboard and the like is being shredded and conveyed to the cardboard receiving chamber 20A, the control sleeve 29 is rotated to close openings 28A of conduit or trough 28 to prohibit the packaging shredded material from being discharged into the decomposition chamber 20 as said packaging material is being conveyed to the receiving and storing chamber 20A. Generally, the receiving chamber 20A functions as a storage receptacle for the shredded cardboard material and the like until needed for blending as will be described herein.

In operation, when the waste or rotten organic food, fruits or vegetables are being shredded, the control sleeve 29 is rotated so that the slots 28A in the conduit or sleeve 28 are opened. As the organic vegetable waste is being shredded, conveyor 19 is actuated so as to convey a predetermined amount of shredded cardboard or wood waste from the cardboard receiving chamber 20A to the mixer 23 where the shredded box or carton material is mixed and blended with the waste organic fruits and vegetables being shredded. The outlet end of conveyor 19 effects a transfer of the shredded carton material carried thereby to a riser conveyor 19A (FIG. 5) that discharges the carton or packaging shreds above the mixer 23 to mix with the organic waste being shredded as said organic vegetable waste is being discharged from the shredder 22 to form a blend having a predetermined ratio so as to effect optimum composting blend of the organic vegetable waste and the shredded carton waste.

From the foregoing, it will be readily apparent that a wholly contained unit for recycling organic waste into reusable compost can be placed on site of those establishments which have a need of disposing of excess organic waste such as rotten fruits, vegetables, and the cartons in which they are shipped or packaged. Such establishments having such particular need are the supermarkets, wholesalers of fruits and vegetables, groceries or restaurants or like establishments that encounter the problem of disposing of such organic vegetable waste materials and their cartons.

In the event the organic waste to be disposed has a high liquid content, e.g. melons and the like, a means may be provided for extracting the liquid or juices and separating such liquid or juices from the solid pulp or waste, and thereafter recirculating the separated juice or liquid to the decomposing chamber 20 to aid in the decomposition process. As an optional equipment, a perforated separation plate may be disposed adjacent the discharge end of the shredder, which is placed at an inclined angle. The juices, extracted from the waste as it is being ground or shredded, pass through the perforations of the inclined separator and collected, as the solid waste sliding off the separator plate is guided into the mixer for blending. The liquid of the juices extracted from the solid waste passing through the openings formed in the separator plate is collected and directed to a suitable liquid collector 50. The collected juices are then pumped from the collector 50 through suitable piping 50A to a suitable spray means 50B, e.g. spray heads or sprinklers. It will be understood that such spray heads 50B is disposed in component section C whereby the liquid is sprayed onto the homogeneous waste being blended in the mixer M to aid in the decomposition of the solid waste.

In operation, the solid waste such as rotten fruits, vegetables, and the cardboard or packaging waste and the like are separately shredded in grinder 22, herein described. The shredded packaging waste is then directed by means of conveyors 24, 25 and 27 to the carton receiving chamber 20A. After the packaging material has been shredded and stored in chamber 20A, the vegetable organic waste is shredded. As the shredded vegetable waste is directed to the blender 23, the conveyor 19 is actuated to convey a predetermined amount of shredded packing material from chamber 20A to the mixing station M where the shredded packaging waste is combined and blended with the shredded organic vegetable waste by the mixer 23. The homogenous blending of organic and packaging waste is then conveyed to the decomposition chamber by means of conveyors 24, 25 and 27 where a decomposition occurs in the lower decomposition chamber 20. Conveyor 25 receives the blended mixture from conveyor 24 and raises the blended mixture to the top of chamber 20 where it is transferred to a horizontal conveyor 27 wherein the control sleeve 29 is rotated relative to conduit 28 to expose openings 28A through which the blended waste is discharged into chamber 20. Intermixing with the free falling waste is a stream of aerating air which is recirculated by means of a recirculating blower 30. The recirculating air is tempered by fresh incoming air so that fresh air, mixed with a portion of the recirculating air, is recirculated back to the decomposition chamber 20. Also, a portion of the mixed fresh and recirculating air is exhausted to atmosphere, whereby the amount of exhausting air substantially equals the amount of fresh air being introduced into the cycle. In exhausting, the exhausting air may be filtered to minimize the odor of any undesirable gases being exhausted. In time, the solid waste fruits, vegetables, cartons and the like will decompose into a reusable and recyclable compost.

If a single decomposition chamber is used, the formed compost is removed from the chamber 20 by means of a screw conveyor 41A in a manner described in my prior U.S. Pat. No 5,766,935. However, in accordance with this invention, wherein a secondary decomposition chamber 20B is desirable and/or for purposes of additional storage of the compost, the composted or partially composted material in chamber 20B is discharged or removed therefrom by conveyor 61 or optionally, the material is transferred to a vertical conveyor 60 to elevate the composted or partially composted material to the superposed tertiary chamber 20B'. From the vertical conveyor 60, the composted material is transferred to an upper distributing conveyor 43 to disperse the composted or partially composted material longitudinally along the length of the chamber 20B. This is attained by a conduit 44, which is provided with openings, to permit the material being conveyed by conveyor 43 to be discharged into chamber 20B.

The arrangement is such that chamber 20B may be used as a storage chamber to store the material which has been composted in the lower decomposition chamber 20, or the chamber 20B may be used as a secondary or further decomposition chamber.

To permit chamber 20B to be used as a secondary or final decomposition chamber, it will be understood that the chamber 20B is provided with means for aerating the composting material with air in a manner described with respect to chamber 20. This is attained by extending an air conduit 50, in communication with the outlet of the air pump 30, upwardly to the secondary chamber 20B. The upper end of conduit 50 in turn is connected to a U-shaped air distributor 56 which is similar to the air distributor 33 disposed in chamber 20.

To provide moisture to the composting material in the secondary chamber 20B, there are provided spray heads, it being understood that the spray heads 52 in the secondary chamber are suitably connected to a water supply by means of extending pipe or conduit 51 to the secondary or superposed chamber 20B.

To convey the composted material out of the secondary chamber 20B, a conveyor means 61 similar to conveyor 41A is provided.

FIG. 9 is referenced to a modified embodiment of the invention wherein a third decomposition or storage chamber 20B' is superposed or stacked above the secondary chamber 20B. It will be understood that the structure of the third chamber 20B' is similar to that of secondary chamber 20B. The only difference is that the conveyor 60 is extended upwardly another level to convey the composting material from the secondary chamber 20B to the uppermost chamber 20B' in the same manner as hereinbefore described. The material stored or composting in the uppermost chamber 20B' is removed therefrom by a conveyor screw 71 located in the bottom of chamber 20B' in a manner similar to that described with respect to conveyor 61.

It will be noted that when stacked decomposition chambers are used, a housing 70 is disposed about the discharge end of conveyors 41A and/or 61 to facilitate the transfer of the compost material to the vertical conveyor 60 to transport the composting material to the next upper chamber. It will be understood that suitable control means are provided to control the operation of the respective described components so that the entire unit may be automatically operated.

While the present invention has been described with respect to more than one embodiment, it will be understood that various modifications may be made without departing from the spirit or scope of the invention.

What in claimed is:

1. An apparatus for converting a mixture of organic vegetable waste and carton or packaging waste generated by various types of food distributors and food handlers into reusable compost comprising:

a housing partitioned to define a component section, decomposition chamber, and a receiving chamber for the temporary storing of carton waste, said component section having a chute for receiving the organic and packaging waste, said chute having an inlet and outlet, a shredding station located in said component section adjacent said outlet of said chute for shredding any waste introduced into said chute, a mixing station downstreamwise from said shredding station, a conveyor for conveying the shredded/carton waste from said shredding station to said receiving chamber in which said shredded packaging waste is temporarily stored, a second conveyor for transporting said shredded carton waste from said receiving chamber to said mixing station wherein said shredded carton waste is mixed with the organic waste being shredded at said shredding station, said first mentioned conveyor including means for selectively conveying said shredded carton waste to said receiving chamber and said mixture of shredded vegetable waste and carton waste to said decomposition chamber.

2. An apparatus as defined in claim 1 and including:

an air supply means for introducing air into said decomposition chamber to aid in the decomposition of said shredded mixture.

3. An apparatus as defined in claim 1 and including a third conveyor having a portion extending through said decomposition chamber and another portion extending through said receiving chamber for conveying the composting material in said decomposition chamber out of said housing.

4. An apparatus as defined in claim 3 and including an imperforate sleeve circumscribing said another portion of said third conveyor extending through said receiving chamber.

5. An apparatus as defined in claim 1 wherein said first and second conveyors comprise a screw conveyor.

6. An apparatus as defined in claim 1 wherein said first conveyor includes a stationary conduit having a plurality of openings disposed longitudinally therealong, a rotatable conduit mounted for rotation relative to said stationary conduit, said rotatable conduit having a plurality of openings therein, and means for effecting the rotation of said rotatable conduit relative to said stationary conduit whereby the openings of said rotatable conduit are rotated into and out of registration with the openings in said stationary conduit.

7. An apparatus as defined in claim 1 and including:

a second decomposition chamber stacked above said housing, a third conveyor for effecting the removal of material being composted in said first mentioned decomposition chamber, and a fourth conveyor for receiving the composting material from said third mentioned conveyor for transporting said composting material to said second decomposition chamber, and a distributing conveyor in said second decomposition chamber for dispersing said composting material in said second decomposition chamber.

8. An apparatus as defined in claim 7 and including means for introducing aerating air into each of said first and second decomposition chamber to aid the decomposition process of said mixture of organic vegetable waste and packaging waste.

9. An apparatus for composting organic vegetable waste mixed with packaging waste comprising:

a house, partitioning disposed in said housing to define a component section, a decomposition chamber, and a receiving chamber for temporarily storing shredded packaging waste, a shredding station disposed in said component section, said shredding station including a shredder, a mixing station disposed downstreamwise of said shredding station in said component section, said mixing station including a mixer, an access opening in said housing for directing said organic vegetable waste or packaging waste to said shredding station to be shredded by said shredder, a series of conveyors for selectively conveying either said shredded packaging waste to said receiving chamber or a mixture of said organic waste and packaging waste to said decomposition chamber, a conveyor associated with said receiving chamber for transporting the shredded packaging waste disposed in said receiving chamber to said mixing station whereby said shredded packaging waste transported by the associated conveyor is discharged into said mixer to be mixed with the organic vegetable waste being shredded at said shredding station, and directed to said mixer, another conveyer extending through said decomposition chamber and receiving chamber for effecting the removal of said composting material from said housing, and means for circulating aerating air through said decomposition chamber to aid the composting process.

10. An apparatus as defined in claim 9 wherein said series of conveyors incudes a dispersing conveyor extending longitudinally adjacent the top of said decomposition chamber and extending partially into the receiving chamber, a stationary conduit operatively associated with said dispersing conveyor which is co-extensive to the length of said decomposition chamber, said stationary conduit having a series of openings along the length thereof, a rotatable conduit journalled for relative rotation relative to said stationary conduit, said rotatable conduit having openings form therein, and a means for effecting the rotation of said rotatable conduit relative to said stationary conduit wherein the openings of said rotatable conduit may be indexed into and out of registration with said openings of said stationary conduit to effect the opening and closing of said openings of said stationary conduit.

11. The apparatus as defined in claim 10 and including a plurality of baffles extending longitudinally of said decomposition chamber adjacent said dispersing convey to laterally spread the mixture of organic vegetable waste and packaging waste being discharged into said decomposition chamber.

* * * * *